A. GRAF.
JUNCTION BOX FOR ELECTRIC SUPPLY MAINS.
APPLICATION FILED NOV. 28, 1919.

1,414,874.  
Patented May 2, 1922.

Inventor-
Alexander Graf
By
B. Singer, Atty.

UNITED STATES PATENT OFFICE.

ALEXANDER GRAF, OF BERLIN-HERMSDORF, GERMANY.

JUNCTION BOX FOR ELECTRIC SUPPLY MAINS.

1,414,874.  Specification of Letters Patent.  Patented May 2, 1922.

Application filed November 28, 1919. Serial No. 341,226.

*To all whom it may concern:*

Be it known that I, ALEXANDER GRAF, of Libau, Curland, Russia, residing at 20 Waldseestrasse, Berlin-Hermsdorf, Germany, have invented new and useful Improvements in Junction Boxes for Electric Supply Mains, of which the following is a specification.

The known junction boxes for electric supply mains generally consist of a porcelain or earthenware base upon which the metal parts for connecting the various wires are mounted, metallic connections being arranged in the base which serve to interconnect the parts corresponding to each pole. These metallic connections are generally embedded in the base, beneath an insulating compound that is poured in in a molten state and insulates the connections. The parts corresponding to poles of different signs are, of course, insulated from each other.

For fixing the various incoming and outgoing leads or wires, metal screws are used which fit into metal parts that are arranged in the porcelain base and are provided with openings through which the wires can be inserted.

A great drawback of these known junction boxes is that the large number of screws, which are naturally of a very small size, can easily be lost, thus rendering the whole contrivance useless. Besides, the fixing of the metal to the porcelain base is a combersome operation, and the manufacture of the peculiarly shaped porcelain body involves considerable difficulty and expense.

The object of the present invention is to provide a new type of junction box in which the said drawbacks are avoided and which has no fixed parts which can be detached and lost.

This is accomplished by making the new box consisting of two round low parts, one of which fits over the other like a cap and which are held together by a screw or some other suitable fastening means. The lower part or base takes the incoming and outgoing wires or leads and, for this purpose, is provided with any desired number of perforations. Joining on to these perforations at the top of the base are grooves into which the wires are laid. The base itself is made of an insulating substance, so that the wires when inserted in the grooves, are electrically insulated from each other. The electrical connections between the wires to be interconnected are effected by means of the upper part or cap of the box.

Arranged in this cap, which also consists of an insulating substance, are two strips of metal having metal ribs that enter into the said grooves in the base of the box when the cap and base are fitted together. To enable the wires to be adequately fixed in the grooves without the aid of the said ribs a ring of insulating material may be arranged around the lower edge of the base which presses the wires into the grooves and holds them in place.

A manner of carrying out the invention is illustrated in the drawing in which—

Figure 5:
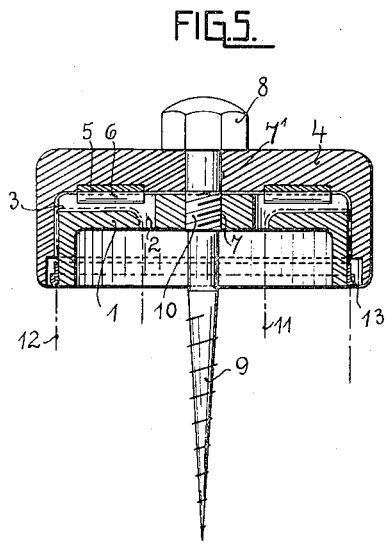

Fig. 5 shews the cap and base fitted together and

Figure 6:
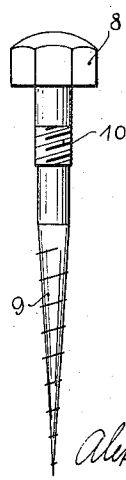

Fig. 6 illustrates a vertical elevation of a suitable form of fastening screw.

In the middle of the base 1, which is made of an insulating substance, there is a number of holes 2 which join on to grooves 3 that extend to the edge of the base. Pressed into the cap 4 are two metal strips 5 having ribs 6. These strips 5 are insulated from each other. The positions and size of the ribs 6 correspond to those of the grooves 3 in base. The base and the cap have central holes 7 and 7' respectively. The hole 7 has a female thread. The cap and base are fixed together as shewn in Fig. 5 by a screw 8 whose lower portion 9 is shaped in the form of a wood screw or adapted to be fixed in a stone wall as the case may be, whilst the upper thread 10 fits into the female thread in the hole 7.

The base and cap, however, may be fixed together by a screw without the thread 10 and having a male thread at the top, instead of the head 8, onto which a nut is screwed. If desired an additional locking nut may be provided. The female thread situated in the cap and corresponding to 10 will then, of course, be superfluous and an ordinary smooth hole would be provided.

Figure 1:
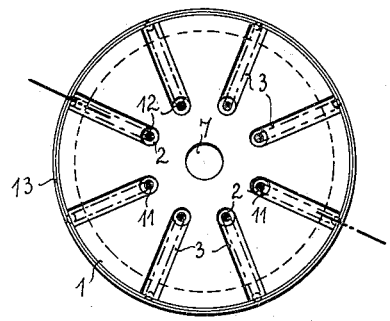
Fig. 1 is a plan view of the base of the junction box.
Figure 3:
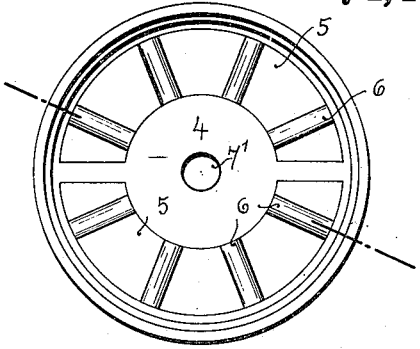
Fig. 3 is a bottom view of the cap of the junction box.
Figure 2:
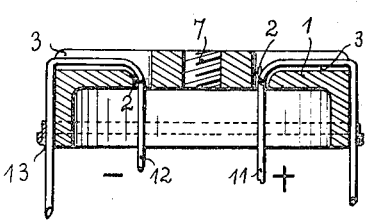
Fig. 2 is a vertical section through Fig. 1.
Figure 4:
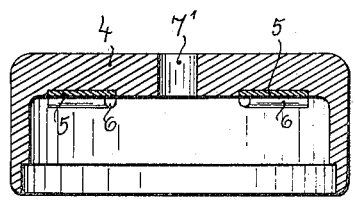
Fig. 4 represents a vertical section through Fig. 3.

With this type of fastening device the thread 9 of the screw is fixed in the wall with the aid of cement, plaster of Paris, or the like. The base of the box is then pushed over the fixed screw, the wires inserted in the grooves and fastened by pushing on the clamping ring 13, so that the wires are held between the said ring and the periphery of the base, as shown in Figs. 1 and 2, the cap put on so that its ribs fit into the grooves, and by screwing the nut onto the male thread at the top of the screw the cap and base are fixed together and secured in their place on the wall.

The device is used in the following manner:

The positive lead 11 of the supply main and the negative lead 12 are each inserted from below through a hole 2 and laid into their respective grooves in the base. The outgoing branch wires are inserted through adjacent holes. The electrical connections between the supply leads and the branch wires are established by the metallic portions or strips 5 of the cap 4. The wires are also held in place by the ring 13 of insulating substance.

I claim:—

1. A junction box for electric supply mains and branch wires comprising a base with holes passing from the bottom to the top and grooves joining on the holes at the top, the holes and grooves being adapted to receive the mains and wires, a ring of insulating material fitting round the lower edge of the said base and adapted to hold the mains and wires in the said grooves, a cap with metal strips having ribs fitting into the said grooves, and means for holding the cap and base together.

2. A junction box for electric supply mains and branch wires comprising a base with holes passing from the bottom to the top and grooves joining on the holes at the top, the holes and grooves being adapted to receive the mains and wires, a ring of insulating material fitting round the lower edge of the said base and adapted to hold the mains and wires in the said grooves, a cap with metal strips having ribs fitting into the said grooves, a screw for holding the cap and base together and for fixing the entire box on a wall.

In testimony whereof I have signed this specification in the presence of two witnesses.

ALEXANDER GRAF.

Witnesses:
WILH. LOCHNER,
WALTHER FEST.